United States Patent
Zhang et al.

(10) Patent No.: US 10,129,792 B2
(45) Date of Patent: Nov. 13, 2018

(54) DATA PROCESSING APPARATUS IN WIRELESS NETWORK, AND WIRELESS NETWORK SYSTEM

(71) Applicant: Huawei Technologies Co., Ltd., Shenzhen (CN)

(72) Inventors: Wei Zhang, Shanghai (CN); Chenghui Peng, Munich (DE)

(73) Assignee: Huawei Technologies Co., Ltd, Shenzhen (CN)

( * ) Notice: Subject to any disclaimer, the term of this patent is extended or adjusted under 35 U.S.C. 154(b) by 161 days.

(21) Appl. No.: 15/223,463

(22) Filed: Jul. 29, 2016

(65) Prior Publication Data
US 2016/0337905 A1 Nov. 17, 2016

Related U.S. Application Data

(63) Continuation of application No. PCT/CN2014/071821, filed on Jan. 29, 2014.

(51) Int. Cl.
| | |
|---|---|
| *H04W 28/16* | (2009.01) |
| *H04L 12/801* | (2013.01) |
| *H04L 29/12* | (2006.01) |
| *H04W 28/02* | (2009.01) |
| *H04W 28/06* | (2009.01) |

(Continued)

(52) U.S. Cl.
CPC .......... *H04W 28/16* (2013.01); *H04L 45/42* (2013.01); *H04L 45/50* (2013.01); *H04L 47/17* (2013.01); *H04L 61/256* (2013.01); *H04W 28/0289* (2013.01); *H04W 28/065* (2013.01)

(58) Field of Classification Search
CPC ..... H04L 12/4633; H04L 45/42; H04L 45/38; H04L 41/0226; H04L 41/042
See application file for complete search history.

(56) References Cited

U.S. PATENT DOCUMENTS

| | | |
|---|---|---|
| 6,961,326 B1 | 11/2005 | Chang et al. |
| 7,801,049 B2 | 9/2010 | He |
| | (Continued) | |

FOREIGN PATENT DOCUMENTS

| | | |
|---|---|---|
| CA | 2874825 A1 | 12/2013 |
| CN | 101212451 A | 7/2008 |
| | (Continued) | |

*Primary Examiner* — Jung Park
(74) *Attorney, Agent, or Firm* — Slater Matsil, LLP

(57) ABSTRACT

A wireless network system includes: a single network controller (SNC) that is configured to perform a centralized control function, an ingress network element that is configured to perform matching on a data flow processing rule, and a function node network FNN that is configured to perform a user plane function. The FNN includes at least one function node FN, both the ingress network element and the FN are communicatively connected to the SNC, and at least two FNs are connected to each other directly or through an Internet Protocol IP network. The SNC is specifically configured to implement a control plane function of the wireless network system; the ingress network element is specifically configured to perform rule matching and mark a data packet with a label. The FN is specifically configured to perform one or a combination of data processing and data forwarding according to the label.

20 Claims, 10 Drawing Sheets

(51) Int. Cl.
  *H04L 12/717*  (2013.01)
  *H04L 12/723*  (2013.01)

(56) References Cited

U.S. PATENT DOCUMENTS

| | | |
|---|---|---|
| 8,825,876 B2 | 9/2014 | Krishnaswamy et al. |
| 2002/0095614 A1 | 7/2002 | Rodgers et al. |
| 2003/0131258 A1 | 7/2003 | Kadri |
| 2012/0092992 A1 | 4/2012 | Pappas et al. |
| 2012/0093158 A1 | 4/2012 | Chiba |
| 2012/0166618 A1 | 6/2012 | Dahod et al. |
| 2012/0300615 A1 | 11/2012 | Kempf et al. |
| 2013/0010600 A1 | 1/2013 | Jocha et al. |
| 2013/0088967 A1 | 4/2013 | Kusumoto |
| 2013/0223452 A1 | 8/2013 | Shimonishi et al. |
| 2013/0246602 A1 | 9/2013 | Pandya et al. |
| 2013/0287026 A1* | 10/2013 | Davie ............... H04L 49/70 370/392 |
| 2015/0016286 A1* | 1/2015 | Ganichev ........... H04L 12/4633 370/252 |
| 2015/0200850 A1 | 7/2015 | Akiyoshi |
| 2017/0142012 A1* | 5/2017 | Thakkar ............. H04L 45/7453 |

FOREIGN PATENT DOCUMENTS

| | | |
|---|---|---|
| CN | 102100112 A | 6/2011 |
| CN | 102594707 A | 7/2012 |
| CN | 102792646 A | 11/2012 |
| CN | 102884768 A | 1/2013 |
| CN | 102884769 A | 1/2013 |
| CN | 103380640 A | 10/2013 |
| EP | 2487844 A1 | 8/2012 |
| RU | 2204215 C2 | 5/2003 |
| RU | 2233470 C2 | 7/2004 |
| WO | 2013074827 A1 | 5/2013 |
| WO | 2013144747 A1 | 10/2013 |

* cited by examiner

DATA PROCESSING APPARATUS IN WIRELESS NETWORK, AND WIRELESS NETWORK SYSTEM

CROSS-REFERENCE TO RELATED APPLICATIONS

This application is a continuation of International Application No. PCT/CN2014/071821, filed on Jan. 29, 2014, which is hereby incorporated by reference in its entirety.

TECHNICAL FIELD

Embodiments relate to communications technologies, and in particular, to a data processing apparatus in a wireless network, and a wireless network system.

BACKGROUND

A wireless network architecture defined in the existing 3rd Generation Partnership Project (3GPP for short) protocol mainly includes: a mobility management entity (MME for short), a serving gateway (SGW for short), a public data network gateway (PGW for short), a base station (Evolved Node B, eNodeB for short), and the like. In terms of product implementation, the foregoing components exist as independent physical entities, and implement their respective functions. For example, the PGW is configured to implement multiple data plane functions, including a mobile Internet protocol (IP for short), data packet filtering, general packet radio service tunneling protocol (GTP for short) tunnel management, information security, service charging, and the like. With development of communications technologies, to adapt to progress of a communications standard, increasing functions may be integrated into a network device in the foregoing wireless network.

However, these functions are tightly coupled, and mutual restrictions exist inside each network device and between network devices, which results in poor scalability and low communications efficiency of the wireless network.

SUMMARY

Embodiments provide a data processing apparatus in a wireless network, and a wireless network system, to improve scalability and communications efficiency of the wireless network system.

An embodiment provides a wireless network system. The system includes a single network controller (SNC) that is configured to perform a centralized control function, an ingress network element that is configured to perform matching on a data flow processing rule, and a function node network (FNN) that is configured to perform a user plane function, where the FNN includes at least one function node (FN). Both the ingress network element and the FN are communicatively connected to the SNC, and at least two FNs are connected to each other directly or through an Internet Protocol IP network. The SNC is specifically configured to perform signaling processing to implement a control plane function of the wireless network system, and control and manage work of the ingress network element and the FN in a manner of delivering a data flow processing rule to the ingress network element or the FN. The ingress network element is specifically configured to perform matching between a data packet and the data flow processing rule, and mark a successfully matched data packet in a label form, so that the FN acquires, according to the label, instruction information of a data operation that needs to be performed. The FN is specifically configured to acquire, according to the label, the instruction information of the data operation that needs to be performed, and perform one or a combination of data processing and data forwarding according to the instruction information.

According to the data processing apparatus in the wireless network, and the wireless network system in the embodiments, functions of devices in a wireless network system are decoupled and divided into a control plane function module and a user plane function module, control plane function modules of multiple devices are combined to form a single network controller, the user plane function module is divided according to a fine granularity and then is deployed in a function node network in a function node form, and the single network controller controls a behavior of a user plane function node in a manner of delivering a data flow processing rule and may further dynamically increase or decrease a function node, which is flexible and high-efficient and implements independence between functions of the wireless network system, thereby resolving problems of poor scalability and low communications efficiency of a wireless network that are caused by restrictions between functions inside each network device and among network devices.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
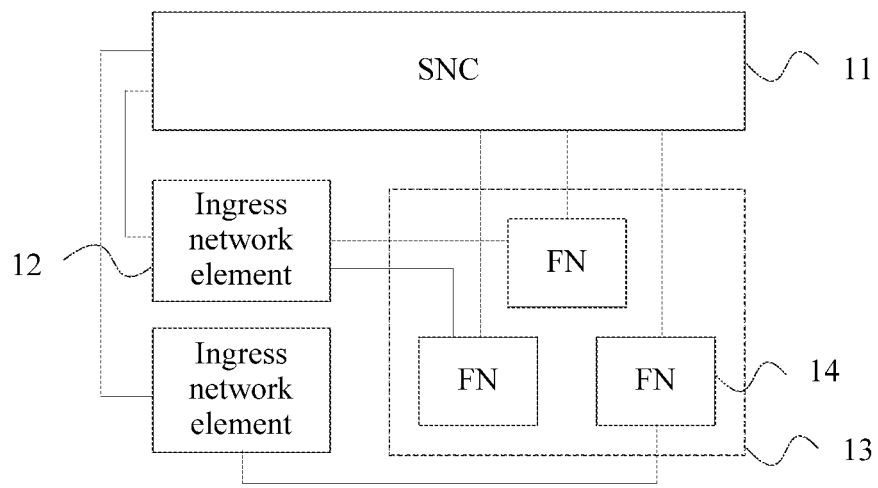
FIG. 1 is a schematic structural diagram of Embodiment 1 of a wireless network system.

FIG. 1 is a schematic structural diagram of Embodiment 1 of a wireless network system. As shown in FIG. 1, the system in this embodiment includes a single network controller (SNC for short) 11 that is configured to perform a centralized control function. The system also includes an ingress network element that is configured to perform matching on a data flow processing rule, and a function node network (FNN for short) 13 that is configured to perform a user plane function, where the FNN 13 includes at least one function node (FN for short) 14, both the ingress network element 12 and the FN 14 are communicatively connected to the SNC ii, and at least two FNs 14 are connected to each other directly or through an IP network. The SNC 11 is specifically configured to perform signaling processing, and control and manage work of the ingress network element 12 and the FN 14 in a manner of delivering a data flow processing rule to the ingress network element or the FN, to implement a control plane function of the wireless network system. The ingress network element 12 is specifically configured to perform matching between a data packet and the data flow processing rule, and mark a successfully matched data packet in a label form, so that the FN 14 acquires, according to the label, instruction information of a data operation that needs to be performed. The FN 14 is specifically configured to acquire, according to the label, the instruction information of the data operation that needs to be performed, and perform one or a combination of data processing and data forwarding according to the instruction information, where parameter information required for data processing is determined according to a service requirement performed by the wireless network system.

In this embodiment, functions of network elements such as an SGW and a PGW in an existing wireless network architecture are decoupled and divided into a control plane function module and a user plane function module. All control plane function modules are combined with an MME to form the SNC 11 in the wireless network system, and all user plane function modules form the FNN 13. Further, the user plane function modules may be divided into more single function modules according to a function granularity. For example, according to a protocol layer structure of a wireless network, a user plane function at a physical layer, a user plane function at a scheduling layer, and a user plane function at a network layer are separately divided, and user plane functions obtained after division are implemented by independent FNs 14 and may be deployed in the FNN 13. When the FNN 13 includes at least two FNs 14, the at least two FNs 14 may be connected to each other directly or through an IP network, where internal data forwarding of the IP network may be performed in a manner of a software defined network (SDN for short), or in a conventional autonomous manner. This embodiment sets no specific limitation thereto.

Further, the foregoing SNC 11 is further configured to increase or decrease the ingress network element according to a load status of the ingress network element, and increase or decrease the FN according to a load status of the FN.

The SNC 11 in this embodiment may be responsible for functions in three aspects: The first aspect is centralized signaling processing, including processing user-related signaling such as user access authentication, mobility, and bearer management, and processing interactive signaling between network element devices such as network status information update and network topology maintenance. The second aspect is centralized control, where work of the ingress network element 12 and the FN 14 is controlled and managed in a manner of delivering the data flow processing rule to the ingress network element 12 or the FN 14, to implement the control plane function of the wireless network system. Specifically, the SNC 11 may decide a processing policy for a data packet according to signaling or according to a rule request message sent by the ingress network element 12, where the processing policy may include a processing path and a processing manner, a parameter, or the like of the data packet, and transfer, by using the ingress network element 12, a processing rule to the FN 14 that performs the processing policy, to instruct the FN 14 to perform a corresponding data operation and complete service processing of the wireless network system, where centralized control is a core function of the SNC 11. The third aspect is dynamic resource adjustment, including increasing or decreasing the ingress network element 12 according to the load status of the ingress network element 12, and increasing or decreasing the FN 14 according to the load status of the FN 14. Specifically, the SNC 11 may monitor working states of the ingress network element 12 and the FN 14, where in a case in which a device is in an overload working state, resources are scheduled to dynamically increase the device in the overload working state; on the contrary, in a case in which a device is in an underloaded state or even in an unloaded state, the device is deleted from the wireless network system. As an ingress point at which a data packet arrives at the wireless network system from an external network, the ingress network element 12 is configured to perform rule matching on the data packet to acquire a data flow processing rule corresponding to the data packet, and mark the data packet with a label, where the label may enable a subsequent FN 14 to directly index a processing manner, a parameter, or the like of the data packet. The FN 14 is a device that is in the wireless network system and specifically performs user plane data processing, and can retrieve, according to the label of the data packet, instruction information of a data operation that needs to be performed, where the instruction information may enable the FN 14 to learn a manner of data processing performed by the FN 14 on the data packet, a parameter, or the like, and may further learn next-hop information for forwarding the data packet, where a specific manner of data processing, a specific parameter, or the like may be determined according to a service requirement currently performed by the wireless network system.

According to this embodiment, functions of devices in a wireless network system are decoupled and divided into a control plane function module and a user plane function module, control plane function modules of multiple devices are combined to form a single network controller, the user plane function module is divided according to a fine granularity and then is deployed in a function node network in a function node form, and the single network controller controls a behavior of a user plane function node in a manner of delivering a data flow processing rule and may further dynamically increase or decrease a function node, which is flexible and high-efficient and implements independence between functions of the wireless network system, thereby resolving problems of poor scalability and low communications efficiency of a wireless network that are caused by restrictions between functions inside each network device and among network devices.

Figure 2:
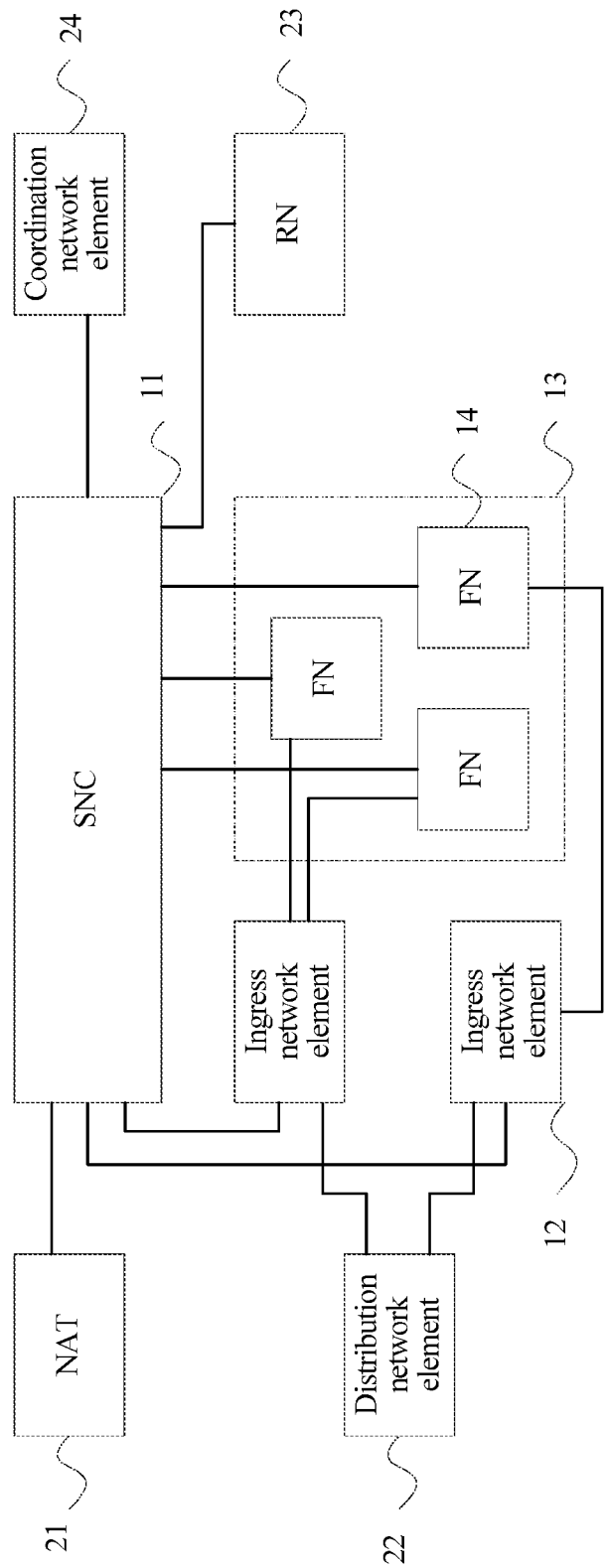
FIG. 2 is a schematic structural diagram of Embodiment 2 of a wireless network system.

FIG. 2 is a schematic structural diagram of Embodiment 2 of a wireless network system. As shown in FIG. 2, on a basis of a structure of the system shown in FIG. 1, the system in this embodiment may further include: a network address translator (NAT for short) 21, a distribution network element 22, a radio node (RN for short) 23, and a coordination network element 24, where the NAT 21 is communicatively connected to the distribution network element 22, and the distribution network element 22 is communicatively connected to the SNC 11 and the ingress network element 12; where the NAT 21 is configured to provide an interface between the wireless network system and an external data network, and send a received data packet to the distribution network element 22 in a polling manner; the distribution network element 22 is configured to receive a distribution rule sent by the SNC 11, and forward, to a corresponding ingress network element 12 according to the distribution rule, the data packet sent by the NAT 21; the RN 23 is configured to implement a radio frequency function of the wireless network system; and the coordination network element 24 is configured to manage resources of the wireless network system, and implement dynamic resource allocation when the SNC 11 needs to increase or decrease the ingress network element 12 or the FN 14 according to a load status.

In this embodiment, the NAT 21 is actually a unified interface between the wireless network system and the external data network, and sends a data packet, sent by an external network, to the distribution network element 22, where a specific sending manner may be a polling manner. For example, if there are three distribution network elements in the wireless network system, the NAT 21 sends the data packet to the three distribution network elements successively in turn, where the NAT 21 herein may determine, by means of counting, a peer distribution network element to which the data packet needs to be sent currently, or may determine the peer distribution network element in another manner, which is not specifically limited herein. The distribution network element 22 is responsible for distributing, according to the distribution rule, the data packet forwarded by the NAT 21 to multiple ingress network elements, where the distribution rule herein is delivered by the SNC 11, and may be pre-configured by the SNC 11 or may be generated by the SNC 11 in real time according to a change of a deployment status of the ingress network element 12. There may be a simple dividing principle for a correspondence between a data packet and an ingress network element, where an IP address of a data packet to be processed by the ingress network element may be bound, that is, an IP network segment processed by each ingress network element is predetermined. The distribution network element 22 sends a data packet to a corresponding ingress network element according to an IP address of the data packet, where the dividing principle herein is only an optional solution, which is not specifically limited herein. The RN 23 implements the radio frequency function of the wireless network system, where the RN 23 in this embodiment may be a radio frequency module, or may be an entire eNodeB, which is not specifically limited herein. The coordination network element 24 is mainly responsible for physical resource management of the wireless network system. When determining to increase or decrease the ingress network element 12 or the FN 14 according to a load status of the ingress network element 12 or the FN 14, the SNC 11 needs to interact with the coordination network element 24. If a device is increased, the coordination network element 24 allocates resources to the newly increased device, or if a device is deleted, the coordination network element 24 recycles resources that are previously occupied by the deleted device. Therefore, a purpose of dynamically adjusting physical resources is achieved.

According to this embodiment, a NAT and a distribution network element provide a data channel between a wireless network system and an external network, an RN provides a radio frequency function for the wireless network system, and a coordination network element manages physical resources of the wireless network system, so that functions of the wireless network system are further decoupled, and multiple functions are separated, which is flexible and high-efficient, and implements independence between functions of the wireless network system, thereby better resolving problems of poor scalability and low communications efficiency of a wireless network that are caused by restrictions between functions inside each network device and among network devices.

Figure 3:
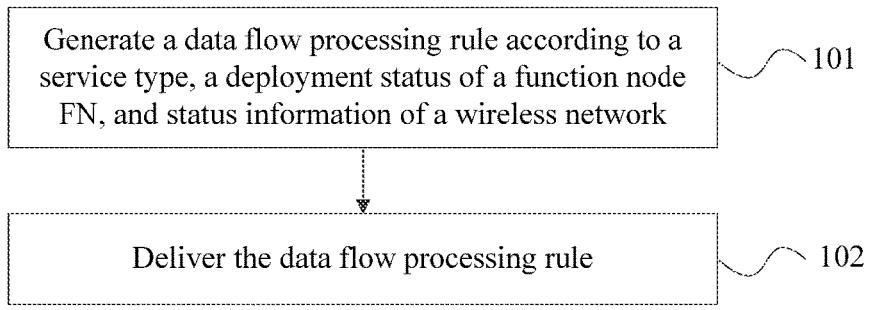
FIG. 3 is a flowchart of Embodiment 1 of a data processing method in a wireless network.

FIG. 3 is a flowchart of Embodiment 1 of a data processing method in a wireless network. As shown in FIG. 3, the method in this embodiment may include the following steps.

Step 101: Generate a data flow processing rule according to a service requirement, a deployment status of a function node FN, and status information of a wireless network.

This embodiment may be executed by an SNC. The SNC generates the data flow processing rule according to the service requirement, the deployment status of the function node FN, and the status information of the wireless network, where the data flow processing rule includes information about a data path for processing a data flow and instruction information of data operations that need to be performed by all FNs on the data path. Specifically, the service requirement is a user service specifically implemented by a wireless network system, including access and handover of user equipment, bearer establishment, or the like. There are many types of services, which are not specifically limited herein. The deployment status of the FN means how user plane functions are divided in the wireless network system during architecture establishment of an FNN, where a quantity of or a scale of FNs included in the FNN varies with different dividing angles and granularities, and user plane functions specifically implemented by the FNs are also different. How the FNs are deployed is not specifically limited herein. The status information of the wireless network includes a current operating status of the wireless network system, for example, whether network congestion occurs or which service the wireless network is used to implement, which is not specifically limited herein, neither. The SNC generates at least one data flow processing rule according to the foregoing information, where the data flow processing rule includes a data path that is for processing a data packet and formed by FNs in a sequential order, where the FNs are FNs that the data packet needs to pass through in the wireless network system after entering the wireless network system; and further includes instruction information of data operations that need to be performed by the FNs, where the instruction information herein includes a processing manner performed on the data packet by the FNs, a parameter, or the like, to control behaviors of the FNs. For example, the processing manner may be bearer establishment, and the parameter may be bearer information that needs to be used during bearer establishment; the FNs are instructed to perform data services for the data packet by using the two pieces of information.

Step 102: Deliver the data flow processing rule.

In this embodiment, the SNC delivers the generated data flow processing rule to a user plane data processing device in the wireless network system, so that an ingress network element performs matching between the data flow processing rule and a data packet forwarded by a distribution network element, and marks a successfully matched data packet with a label, so that the FN acquires, according to the label, instruction information of a data operation that needs to be performed. The SNC controls behaviors of the ingress network element and the FN by using the data flow processing rule. A purpose of performing, by the ingress network element, rule matching on the data packet and marking the data packet with the label according to the data flow processing rule is to reduce workload of rule matching performed by a subsequent FN when performing a data operation, and the FN can acquire, by using only the label as an index to search a local data flow processing rule, instruction information of a data operation that needs to be performed. Once generating and delivering a data flow processing rule, the SNC can control the behaviors of the ingress network element and the FN, thereby implementing a centralized control function of the wireless network system.

According to this embodiment, an SNC generates and delivers a data flow processing rule to a user plane data processing device in a wireless network system, so that the user plane data processing device performs a corresponding data operation according to the data flow processing rule, thereby flexibly and high-efficiently implementing centralized control of the wireless network system.

Further, a specific implementation method for delivering the data flow processing rule in step 102 of the foregoing embodiment may be: delivering the data flow processing rule to the ingress network element, so that the ingress network element performs rule matching between the data packet forwarded by the distribution network element and the locally stored data flow processing rule one by one, and marks a successfully matched data packet with a label; and adds subsequent hop-by-hop routing information to a header of the data packet and forwards the data packet to the FN, so that the FN performs one or a combination of acquiring, according to the label, information for performing data processing and acquiring next-hop routing information according to the subsequent hop-by-hop routing information.

In this embodiment, a source routing manner is adopted to implement routing of a data packet on a data path. When delivering the data flow processing rule, the SNC delivers all generated rules to the ingress network element, and after receiving the data packet forwarded by the distribution network element, the ingress network element performs rule matching between the data packet and all locally stored data flow processing rules one by one. A specific matching manner may be: comparing a match field in the local data flow processing rule with information in a header of the data packet such as an IP address and a service identifier, where matching succeeds if all the information is consistent with the match field, that is, a data flow processing rule corresponding to the data packet is found. The ingress network element is further responsible for marking a successfully matched data packet with a label, where a label and a data flow processing rule have a one-to-one mapping relationship, and a subsequent FN can retrieve a required data flow processing rule only according to a label; and when marking the data packet with the label, the ingress network element further adds subsequent hop-by-hop information to a header of the data packet according to information about a data path in the data flow processing rule. For example, the data packet received by the ingress network element needs to pass through an FN 1, an FN 2, and an FN 3 according to the information about the data path, and then the ingress network element adds, to the header of the data packet, hop-by-hop routing information that is from the FN 1 to the FN 2 and then to the FN 3. Optionally, the subsequent hop-by-hop routing information added by the ingress network element may also be added in a form of a data path label, and the FN can retrieve the next-hop information according to the data path label. The SNC in this embodiment does not directly deliver a data flow processing rule to the FN, but adds the data flow processing rule to an initial data packet and forwards the initial data packet to the FN by using the ingress network element. In a processing process of a subsequent similar data packet, by searching all local data flow processing rules according to a label to acquire a data flow processing rule corresponding to the data packet, the FN can acquire information for performing data processing. The FN may further learn next-hop routing information according to subsequent hop-by-hop routing information that is added to a header of the data packet by the ingress network element. For example, currently a data packet is in an FN 1, and the FN 1 acquires a processing manner and a parameter of the data packet according to a label, further learns, according to subsequent hop-by-hop routing information in a header of the data packet, that a next hop to which the data packet is to be forwarded is an FN 2, and then forwards a processed data packet to the FN 2 according to the routing information. It should be noted that operations performed on a data packet by the FN include data processing and data forwarding, but these two operations do not necessarily need to be performed, where some FNs may be responsible for only data forwarding; some FNs may be responsible for only data processing and do not need to forward the data packet before ending a service; and some FNs may need to perform both data processing and data forwarding, which is not specifically limited herein. A process of delivering a rule to the FN by the SNC is omitted in a rule delivering manner in this embodiment, that is, signaling delivering of the SNC is reduced, so that communications efficiency is improved.

Further, a specific implementation method for delivering the data flow processing rule in step 102 of the foregoing embodiment may be: delivering the data flow processing rule to the ingress network element, and dividing the data flow processing rule into second data flow processing rules, where the second data flow processing rules include one or a combination of information about data processing that needs to be performed by FNs and next-hop routing information for forwarding a data packet; and delivering the second data flow processing rules to corresponding FNs, so that the ingress network element performs rule matching between the data packet forwarded by the distribution network element and the locally stored data flow processing rule one by one, and marks a successfully matched data packet with a label and then forwards the data packet to the FNs, so that the FNs acquire, according to the label and with reference to the local second data flow processing rules, one or a combination of information for performing data processing and next-hop routing information for performing data forwarding.

In this embodiment, a hop-by-hop routing manner is adopted to implement routing of a data packet on a data path. When delivering a data flow processing rule, the SNC delivers all generated rules to the ingress network element, and divides the data flow processing rule into second data flow processing rules, where the second data flow processing rule corresponds to a single FN and includes one or a combination of information about data processing that needs to be performed by the single FN and next-hop routing information for forwarding a data packet. The data flow processing rule generated by the SNC includes instruction information of data operations that need to be performed by all FNs on a data path, and each FN does not need to know an operation that needs to be performed by another FN. Therefore, the SNC may divide the data flow processing rule, where a second data flow processing rule corresponds to a single FN and includes instruction information of a data operation that needs to be performed by the FN. The SNC delivers a second data flow processing rule obtained after division to an FN corresponding to the second data flow processing rule. In this way, each FN stores a part of the data flow processing rule that is needed by the FN. After receiving the data packet forwarded by the distribution network element, the ingress network element performs rule matching between the data packet and all locally stored data flow processing rules one by one. A specific matching manner may be the foregoing matching method, where the ingress network element marks a successfully matched data packet with a label, so that a subsequent FN can retrieve a required data flow processing rule only according to the label. Optionally, the label may include a data path label and a data flow label, and the FN searches a local second data flow processing rule according to the data path label to acquire next-hop routing information, and searches the local second data flow processing rule according to the data flow label to acquire information for performing data processing. Similarly, operations performed on a data packet by the FN include data processing and data forwarding, but these two operations do not necessarily need to be performed, where some FNs may be responsible for only data forwarding; some FNs may be responsible for only data processing and do not need to forward the data packet before ending a service; and some FNs may need to perform both data processing and data forwarding, which is not specifically limited herein.

Further, before the generating a data flow processing rule according to a service requirement, a deployment status of a function node FN, and status information of a wireless network in step 101 of the foregoing embodiment, the SNC may further receive a rule request message sent by the ingress network element or signaling for creating a user data flow, where the two may be used as conditions that trigger the SNC to generate a data flow processing rule. When a data flow processing rule corresponding to a data packet is not matched locally after the ingress network element receives the data packet forwarded by the distribution network element, the ingress network element sends a rule request message to request a new rule from the SNC. When processing signaling, the SNC may also encounter related signaling for creating a user data flow. For example, the signaling may be access of a user and handover of the user, which both may cause a change of a data flow of the user; therefore, a user data flow needs to be recreated. The SNC generates the data flow processing rule according to the foregoing two pieces of information, that is, according to the rule request message, and with reference to the service requirement, the deployment status of the function node FN, and the status information of the wireless network, or generates the data flow processing rule according to the signaling and with reference to the service requirement, the deployment status of the function node FN, and the status information of the wireless network.

Further, before the generating a data flow processing rule according to a service requirement, a deployment status of a function node FN, and status information of a wireless network in step 101 of the foregoing embodiment, the SNC may further generate a distribution rule according to a deployment status of the ingress network element, so that the distribution network element forwards a received data packet to a corresponding ingress network element according to the distribution rule. A process of generating and delivering the distribution rule may be implemented during structure deployment of the wireless network, where the SNC classifies the ingress network element according to information such as a quantity of ingress network elements and a capacity of the ingress network element, for example, according to an IP network segment. In this way, after a data packet arrives at the distribution network element, the distribution network element sends, according to an IP address of the data packet, the data packet to an ingress network element including the IP address, and may further send the data packet according to other information such as a service requirement and a user subscription address, which is not specifically limited herein.

Further, after the delivering the data flow processing rule in step 102 of the foregoing embodiment, the SNC may further interact with a coordination unit according to a load status of the ingress network element, to increase or decrease the ingress network element; and interact with the coordination unit according to a load status of the FN, to increase or decrease the FN. Specifically, the ingress network element is responsible for performing rule matching on a data packet and marking a data packet with a label, and the FN is responsible for specific user plane data processing; the two devices are faced with a relatively heavy load when there is a large amount of data. Therefore, the SNC needs to monitor the two devices in real time, where in a case in which a device is in an overload working state, resources are scheduled to dynamically increase the device in the overload working state; on the contrary, in a case in which a device is in an underloaded state or even an unloaded state, the device is deleted from the wireless network system. In this way, physical resources of the wireless network system can be dynamically adjusted, and efficiency is improved. It should be noted that when monitoring a load of a device, the SNC may determine, according to a working state of a processor of the device or according to workload information periodically reported by the device, whether the device is overloaded or underloaded, where a specific implementation manner is not specifically limited herein.

Figure 4:
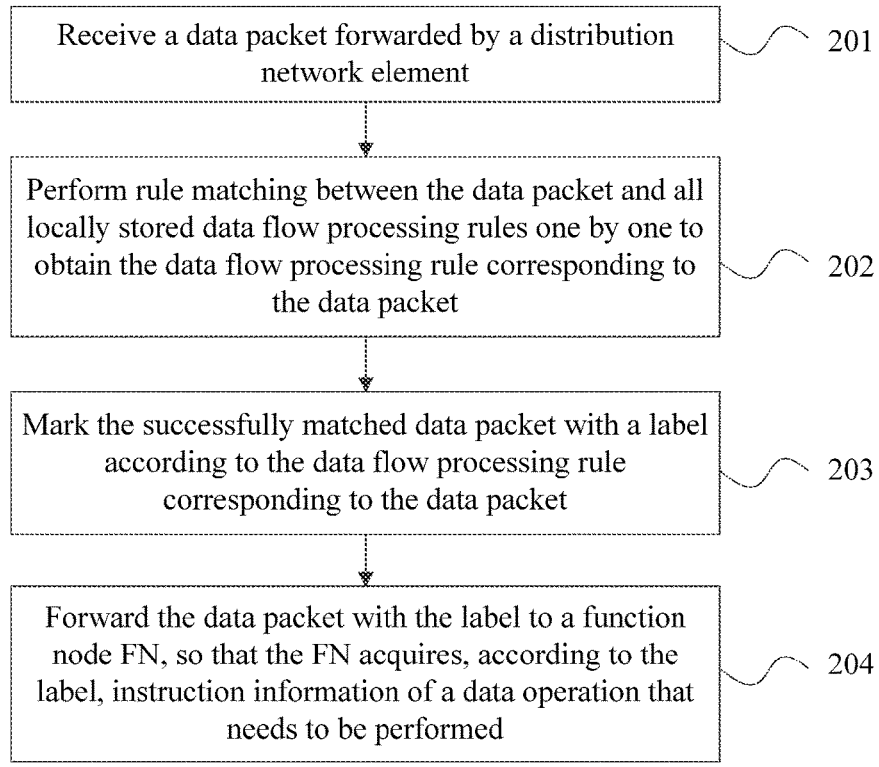
FIG. 4 is a flowchart of Embodiment 2 of a data processing method in a wireless network.

FIG. 4 is a flowchart of Embodiment 2 of a data processing method in a wireless network. As shown in FIG. 4, the method in this embodiment may include the following steps.

Step 201: Receive a data packet forwarded by a distribution network element.

This embodiment may be executed by an ingress network element. The ingress network element receives a data packet forwarded by the distribution network element, where the data packet may be data delivered by a core network to a wireless network system.

Step 202: Perform rule matching between the data packet and all locally stored data flow processing rules one by one to obtain the data flow processing rule corresponding to the data packet.

In this embodiment, the data flow processing rule includes information about a data path for processing the data packet and instruction information of data operations that need to be performed by all FNs on the data path. The ingress network element performs rule matching between the received data packet and all the locally stored data flow processing rules one by one. Multiple data flow processing rules have been stored in the ingress network element, and all these data flow processing rules are generated and delivered by an SNC. When the ingress network element performs matching, a specific implementation manner may be: comparing a match field in a local data flow processing rule with information in a header of the data packet such as an IP address and a service identifier, where if all the information is consistent with the match field, the data flow processing rule corresponding to the data packet is found.

Step 203: Mark the successfully matched data packet with a label according to the data flow processing rule corresponding to the data packet.

In this embodiment, the ingress network element marks a data packet with a label according to a data flow processing rule, where the label herein is determined by the SNC, and the SNC enables a label and a data flow processing rule to have a one-to-one correspondence and broadcasts a mapping result to all devices in the wireless network system. An FN can directly retrieve, according to a label, a data flow processing rule corresponding to a data packet, and does not need to further perform rule matching, which reduces workload of matching.

Step 204: Forward the data packet with the label to a function node FN, so that the FN acquires, according to the label, instruction information of a data operation that needs to be performed.

In this embodiment, the ingress network element forwards the data packet with the label to the FN. Specifically, the ingress network element forwards the data packet with the label to the first FN on the data path included in the data flow processing rule. After receiving the data packet, the first FN can learn next-hop routing information according to the label, and transfer the data packet.

According to this embodiment, rule matching is performed on a data packet, and the data packet is marked with a label, so that a subsequent FN can acquire, only according to the label, instruction information of a data operation that needs to be performed, which reduces workload of rule matching and improves communications efficiency.

Figure 5:
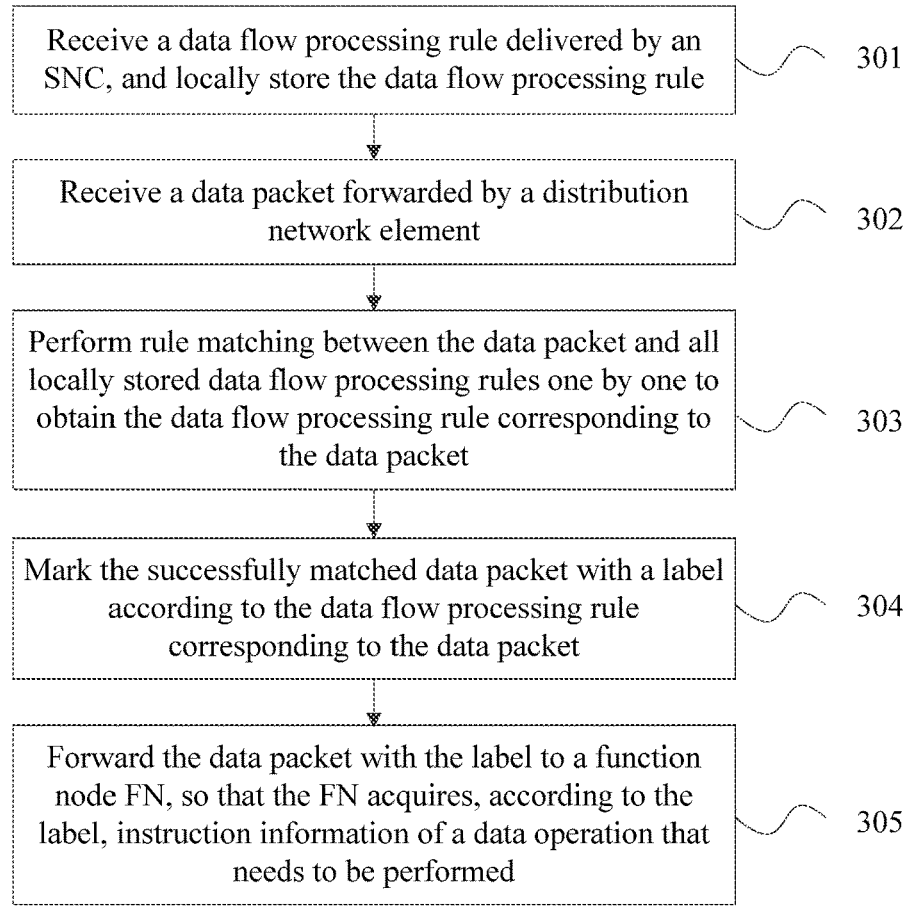
FIG. 5 is a flowchart of Embodiment 3 of a data processing method in a wireless network.

FIG. 5 is a flowchart of Embodiment 3 of a data processing method in a wireless network. As shown in FIG. 5, the method in this embodiment may include the following steps.

Step 301: Receive a data flow processing rule delivered by an SNC, and locally store the data flow processing rule.

In this embodiment, an ingress network element receives the data flow processing rule delivered by the SNC, and locally stores the data flow processing rule, where an opportunity for receiving the rule may be an initial deployment stage of a wireless network system, at which the SNC generates and delivers a data flow processing rule according to a deployment status, or may be time at which the SNC generates and delivers a corresponding data flow processing rule when processing signaling for creating a user data flow. The ingress network element locally stores all received data flow processing rules.

Step 302: Receive a data packet forwarded by a distribution network element.

Step 303: Perform rule matching between the data packet and all locally stored data flow processing rules one by one to obtain the data flow processing rule corresponding to the data packet.

In this embodiment, a process in which the ingress network element performs rule matching is similar to step 202 in the foregoing method embodiment, and details are not described herein again.

Step 304: Mark the successfully matched data packet with a label according to the data flow processing rule corresponding to the data packet.

In this embodiment, the ingress network element may mark the successfully matched data packet with the label according to the data flow processing rule corresponding to the data packet and with reference to label mapping information preset in the single network controller SNC, where the label is mapped to the data flow processing rule corresponding to the data packet; and add subsequent hop-by-hop routing information to a header of the data packet according to the information about a data path. A routing manner of source routing is adopted herein. After marking the data packet with the label, the ingress network element further needs to add the subsequent hop-by-hop routing information to the header of the data packet according to the information about the data path in the data flow processing rule, so that an FN acquires next-hop routing information according to the subsequent hop-by-hop routing information. For example, the data packet received by the ingress network element needs to pass through an FN 1, an FN 2, and an FN 3 according to the information about the data path, and then the ingress network element adds, to the header of the data packet, hop-by-hop routing information that is from the FN 1 to the FN 2 and then to the FN 3. In addition, the subsequent hop-by-hop routing information added by the ingress network element may also be added in a form of a data path label, and the FN can retrieve the next-hop information according to the data path label. Further, in the source routing manner, if the data packet is an initial data packet, the ingress network element may further add a first data flow processing rule to the data packet with the label, where the first data flow processing rule includes information about data processing that needs to be performed by the FN. That is, in this case, a subsequent FN does not store any processing rule about the data packet. Therefore, the ingress network element needs to add a data flow processing rule to the data packet when sending the data packet, where the data flow processing rule herein is different from the data flow processing rule delivered by the SNC, and does not need to include information about a data path because the subsequent hop-by-hop routing information has been added to the header of the data packet. Therefore, the first data flow processing rule includes only the information about data processing that needs to be performed by the FN.

Optionally, the ingress network element may further mark the successfully matched data packet with the label according to the data flow processing rule corresponding to the data packet and with reference to label mapping information preset in the single network controller SNC, where the label is mapped to the data flow processing rule corresponding to the data packet. A routing manner of hop-by-hop routing is adopted herein. The ingress network element does not need to add routing information to the data packet, because the SNC has divided data flow processing information into second data flow processing rules and has delivered the second data flow processing rules to corresponding FNs, and after acquiring the data packet, the FNs acquire, according to the label, instruction information of data operations that need to be performed, where the information includes one or a combination of a manner of data processing, a parameter, and next-hop routing information.

Step 305: Forward the data packet with the label to a function node FN, so that the FN acquires, according to the label, instruction information of a data operation that needs to be performed.

In this embodiment, in the source routing manner, the ingress network element forwards the data packet with the label to a next-hop FN according to the information about the data path, so that all FNs on the data path perform one or a combination of acquiring, according to the label, information for performing data processing and acquiring next-hop routing information according to the subsequent hop-by-hop routing information. The first data flow processing rule retrieved according to the label by the FN includes information about data processing that needs to be performed by the FN, and next-hop routing information may be acquired from the subsequent hop-by-hop routing information in the header of the data packet. It should be noted that operations performed on a data packet by the FN include data processing and data forwarding, but these two operations do not necessarily need to be performed, where some FNs may be responsible for only data forwarding; some FNs may be responsible for only data processing and do not need to forward the data packet before ending a service; and some FNs may need to perform both data processing and data forwarding, which is not specifically limited herein.

In the hop-by-hop routing manner, the ingress network element forwards the data packet with the label to a next-hop FN according to the information about the data path, so that all FNs on the data path acquire, according to the label and with reference to local second data flow processing rules, one or a combination of information for performing data processing and next-hop routing information for performing data forwarding, where the second data flow processing rules include one or a combination of information about data processing that needs to be performed by the FNs and next-hop routing information for forwarding the data packet. It should be noted that operations performed on a data packet by the FN include data processing and data forwarding, but these two operations do not necessarily need to be performed, where some FNs may be responsible for only data forwarding; some FNs may be responsible for only data processing and do not need to forward the data packet before ending a service; and some FNs may need to perform both data processing and data forwarding, which is not specifically limited herein.

According to this embodiment, rule matching is performed on a data packet, the data packet is marked with a label, and a subsequent FN acquires in two routing manners, according to the label, instruction information of a data operation that needs to be performed, which reduces workload of rule matching and improves communications efficiency.

Further, after the receiving a data packet forwarded by a distribution network element in step 302 of the foregoing embodiment, the ingress network element performs rule matching between the data packet and all the locally stored data flow processing rules one by one; if the data flow processing rule corresponding to the data packet is not obtained, sends a rule request message to the SNC, so that the SNC generates the data flow processing rule according to the rule request message and with reference to the service requirement, a deployment status of the function node FN, and a status information of a wireless network; and receives the data flow processing rule delivered by the SNC. Specifically, if the ingress network element does not find the data flow processing rule corresponding to the data packet when performing rule matching on the data packet, the ingress network element needs to send a rule request message to the SNC, so that the SNC generates and delivers a new rule according to the rule request message, that is, the ingress network element may timely request a new data flow processing rule from the SNC. Therefore, a rule generated by the SNC is more flexible and pertinent. In addition, this request mechanism makes a control procedure of the wireless network system more flexible and efficient, and is also a prerequisite for scalability of the wireless network system.

Figure 6:
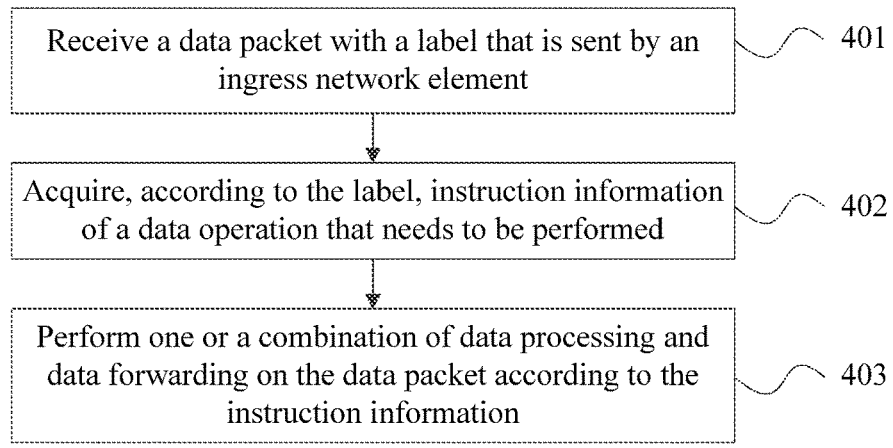
FIG. 6 is a flowchart of Embodiment 4 of a data processing method in a wireless network.

FIG. 6 is a flowchart of Embodiment 4 of a data processing method in a wireless network. As shown in FIG. 6, the method in this embodiment may include the following steps.

Step 401: Receive a data packet with a label that is sent by an ingress network element.

This embodiment may be executed by an FN. The FN receives the data packet with the label that is sent by the ingress network element, where the FN herein may refer to all FNs on a data path, and the FNs receive the data packet in an existing order, where this order is determined when an SNC generates a data flow processing rule.

Step 402: Acquire, according to the label, instruction information of a data operation that needs to be performed.

In this embodiment, by searching a local data flow processing rule according to the label of the data packet, the FN can acquire the instruction information of the data operation that needs to be performed by the FN.

Step 403: Perform one or a combination of data processing and data forwarding on the data packet according to the instruction information.

In this embodiment, the FN processes the data packet according to the instruction information. It should be noted that operations performed on a data packet by the FN include data processing and data forwarding, but these two operations do not necessarily need to be performed, where some FNs may be responsible for only data forwarding; some FNs may be responsible for only data processing and do not need to forward the data packet before ending a service; and some FNs may need to perform both data processing and data forwarding, which is not specifically limited herein.

Further, a specific implementation method for acquiring, according to the label, the instruction information of the data operation that needs to be performed in step 402 of the foregoing embodiment may be: searching a local first data flow processing rule according to the label to acquire the first data flow processing rule corresponding to the label, where the first data flow processing rule includes information about data processing that needs to be performed by the function node FN; and a specific implementation method for performing one or a combination of data processing and data forwarding on the data packet according to the instruction information in step 403 of the foregoing embodiment may be: performing one or a combination of performing data processing on the data packet according to the first data flow processing rule and acquiring next-hop routing information according to subsequent hop-by-hop routing information in a header of the data packet. A source routing manner is adopted herein. The SNC does not directly deliver a data flow processing rule to the FN, and the FN locally stores the first data flow processing rule added by the ingress network element to an initial data packet. The FN may acquire, according to the data flow processing rule retrieved according to the label, a manner of data processing that needs to be performed, a parameter, and the like, and the FN acquires the next-hop routing information according to the subsequent hop-by-hop routing information in the header of the data packet sent by the ingress network element. In this manner, if a data packet is an initial data packet, the FN does not store a data flow processing rule of the data packet; the initial data packet received by the FN further carries a first data flow processing rule, and the first data flow processing rule is stored locally.

Optionally, a specific implementation method for acquiring, according to the label, the instruction information of the data operation that needs to be performed in step 402 of the foregoing embodiment may be: searching a local second data flow processing rule according to the label to acquire the second data flow processing rule corresponding to the label, where the second data flow processing rule includes one or a combination of information about data processing that needs to be performed by the function node FN and next-hop routing information for forwarding the data packet; and a specific implementation method for performing one or a combination of data processing and data forwarding on the data packet according to the instruction information in step 403 of the foregoing embodiment may be: performing one or a combination of data processing on the data packet and next-hop forwarding on the data packet according to the second data flow processing rule. A hop-by-hop routing manner is adopted herein. The SNC divides a data flow processing rule into second data flow processing rules, and delivers the second data flow processing rules to corresponding FNs, where the FNs locally store the second data flow processing rules delivered by the SNC, and the FNs may acquire, according to the data flow processing rules retrieved according to the label, one or a combination of a manner of data processing that needs to be performed, a parameter, and next-hop routing information. In this manner, initially the FN does not store any data flow processing rule; therefore, after generating a data flow processing rule, the SNC needs to deliver the data flow processing rule, and when delivering the rule to the FN, the SNC may divide the rule and deliver only a part of the rule that is corresponding to the FN, that is, a second data flow processing rule; therefore, the FN further needs to receive the second data flow processing rule sent by the SNC.

Figure 7A:
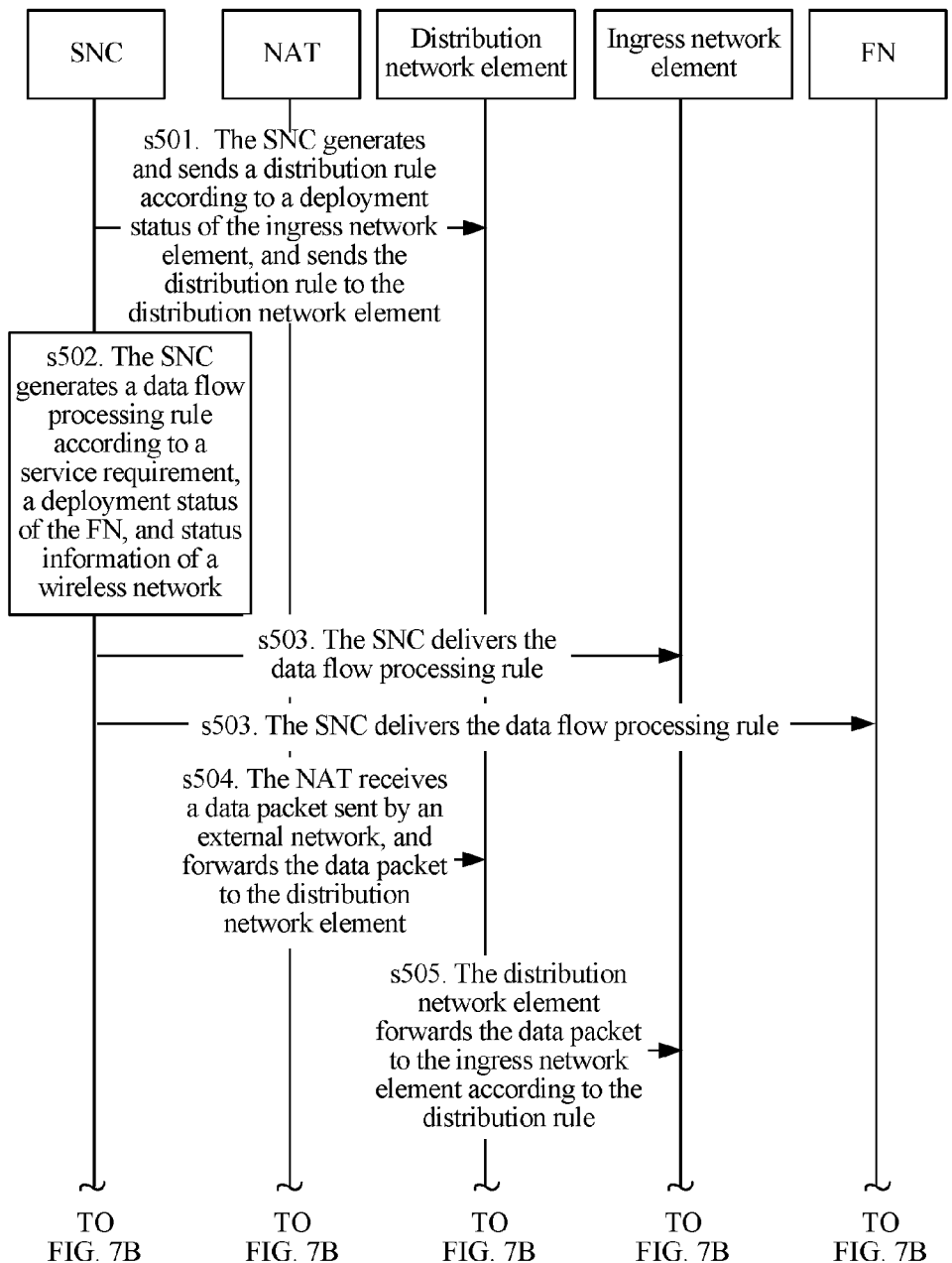
FIG. 7A and FIG. 7B are a flowchart of Embodiment 5 of a data processing method in a wireless network.
Figure 7B:
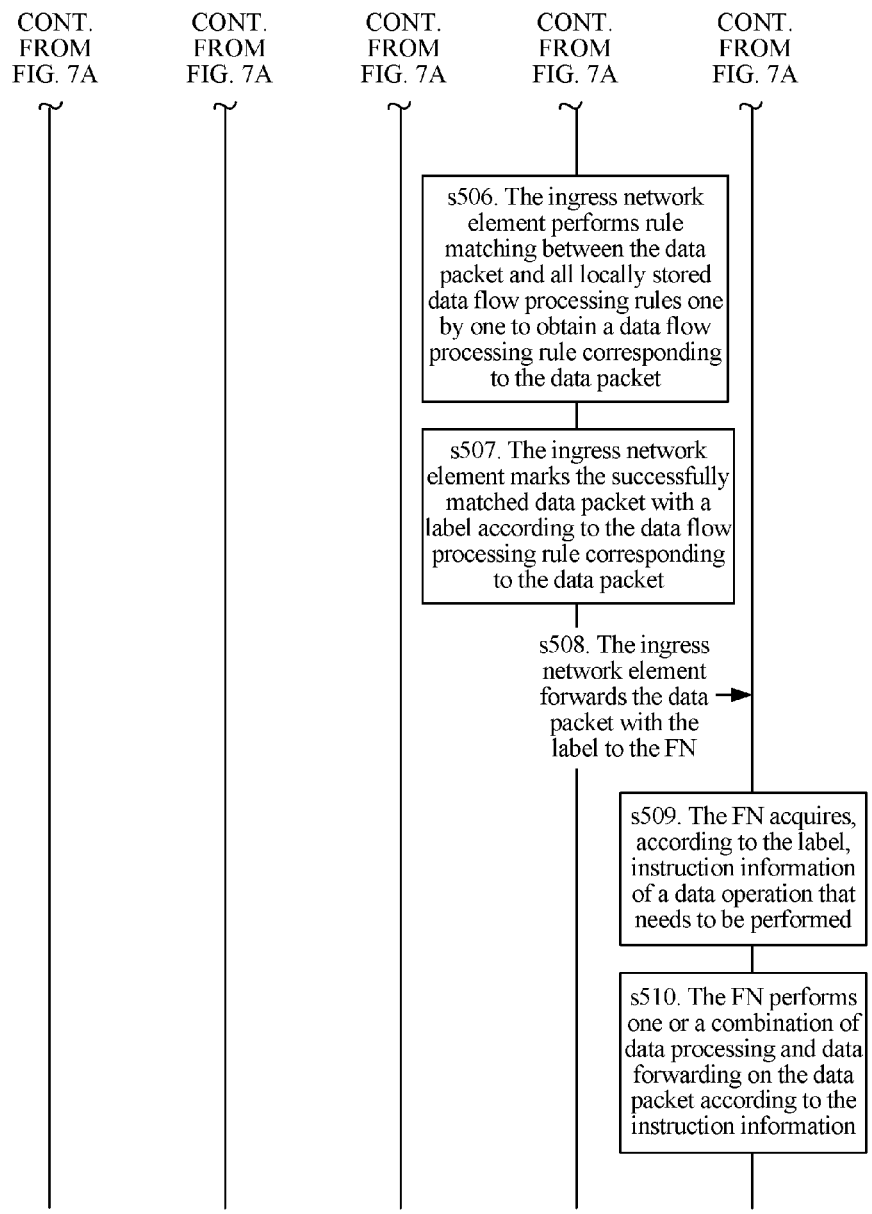

FIG. 7A and FIG. 7B are a flowchart of Embodiment 5 of a data processing method in a wireless network according to the present invention. As shown in FIG. 7A and FIG. 7B, the method in this embodiment may include the following steps.

s501. An SNC generates a distribution rule according to a deployment status of an ingress network element, and sends the distribution rule to a distribution network element.

s502. The SNC generates a data flow processing rule according to a service requirement, a deployment status of an FN, and status information of a wireless network.

s503. The SNC delivers the data flow processing rule.

s504. A NAT receives a data packet sent by an external network, and forwards the data packet to the distribution network element.

s505. The distribution network element forwards the data packet to an ingress network element according to the distribution rule.

s506. The ingress network element performs rule matching between the data packet and all locally stored data flow processing rules one by one to obtain a data flow processing rule corresponding to the data packet.

s507. The ingress network element marks the successfully matched data packet with a label according to the data flow processing rule corresponding to the data packet.

s508. The ingress network element forwards the data packet with the label to an FN.

s509. The FN acquires, according to the label, instruction information of a data operation that needs to be performed.

s510. The FN performs one or a combination of data processing and data forwarding on the data packet according to the instruction information.

According to this embodiment, an implementation process of a data processing method in a wireless network is described by using a flowchart in which network elements in a wireless network system interact with each other. Steps in this embodiment are described in detail in the foregoing embodiments, implementation principles are similar, and details are not described herein again. It should be noted that there may be more than one FN node in the figure. A data packet may need to be forwarded among multiple FNs according to a service requirement, and each FN processes the data packet according to a function of the FN and then forwards the data packet to a next FN according to routing information, until the last FN on a data path completes processing the data packet. Therefore, a function of an FN may be only data processing or only data forwarding. In addition, some FNs may further replicate the data packet, and process and forward the data packet by using multiple paths. For example, this function may be used in a coordinated multipoint transmission (COMP for short) technology.

Figure 8:
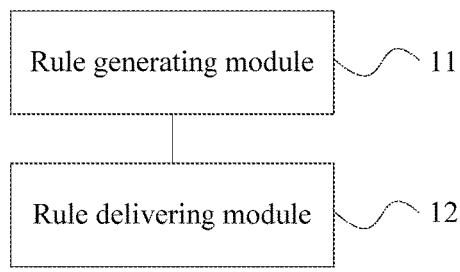
FIG. 8 is a schematic structural diagram of Embodiment 1 of an SNC.

FIG. 8 is a schematic structural diagram of Embodiment 1 of an SNC according to the present invention. As shown in FIG. 8, the apparatus in this embodiment may include: a rule generating module n and a rule delivering module 12, where the rule generating module 11 is configured to generate a data flow processing rule according to a service requirement, a deployment status of a function node FN, and status information of a wireless network, where the data flow processing rule includes information about a data path for processing a data packet, and instruction information of data operations that need to be performed by all FNs on the data path; and the rule delivering module 12 is configured to deliver the data flow processing rule, so that an ingress network element performs matching between the data flow processing rule and a data packet forwarded by a distribution network element, and marks a successfully matched data packet with a label, so that the FN acquires, according to the label, instruction information of a data operation that needs to be performed.

The apparatus in this embodiment may be configured to perform the technical solution in the method embodiment shown in FIG. 3, and implementation principles and technical effects thereof are similar and are not described herein again.

Figure 9:
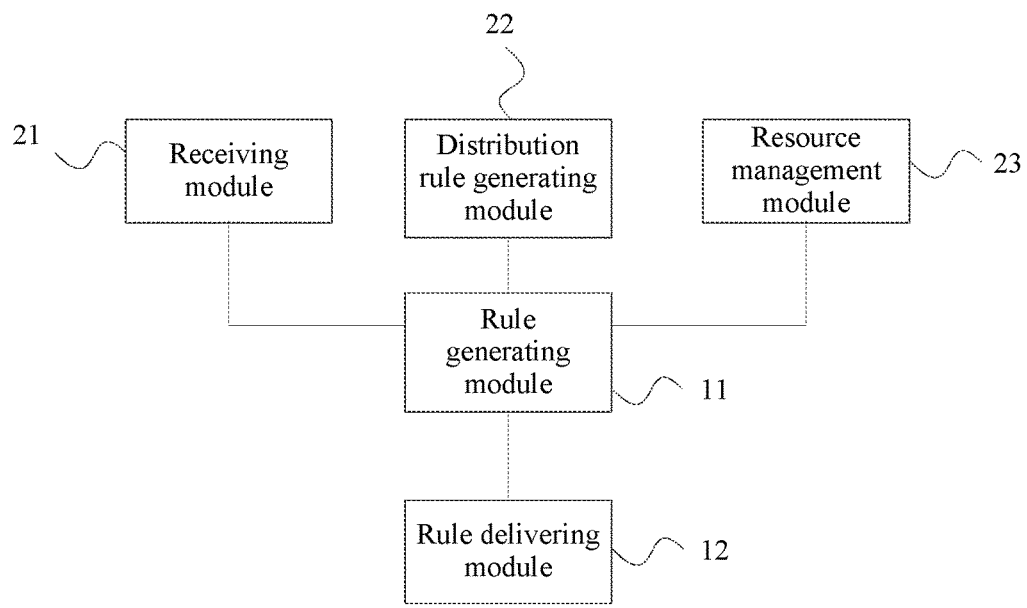
FIG. 9 is a schematic structural diagram of Embodiment 2 of an SNC.

FIG. 9 is a schematic structural diagram of Embodiment 2 of an SNC. As shown in FIG. 9, on a basis of the structure of the apparatus shown in FIG. 8, the apparatus in this embodiment may further include: a receiving module 21, a distribution rule generating module 22, and a resource management module 23, where the receiving module 21 is configured to receive a rule request message sent by the ingress network element; the distribution rule generating module 22 is configured to generate a distribution rule according to a deployment status of the ingress network element, so that the distribution network element forwards a received data packet to a corresponding ingress network element according to the distribution rule; and the resource management module 23 is configured to interact with a coordination unit according to a load status of the ingress network element, to increase or decrease the ingress network element, and interact with the coordination unit according to a load status of the FN, to increase or decrease the FN.

The apparatus in this embodiment may be configured to perform the technical solution in the method embodiment shown in FIG. 3, and implementation principles and technical effects thereof are similar and are not described herein again.

Figure 10:
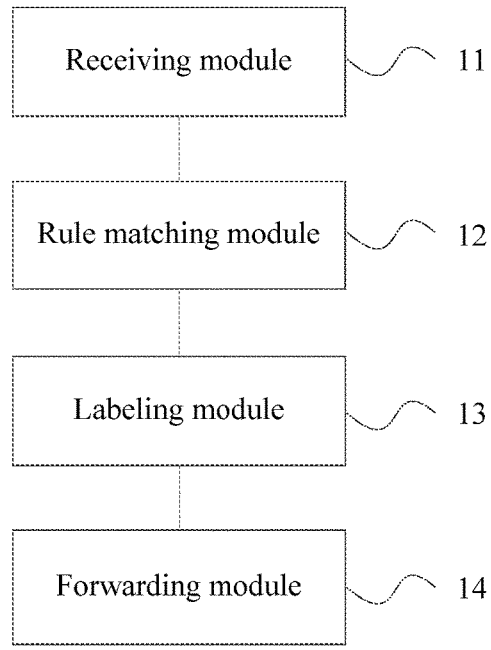
FIG. 10 is a schematic structural diagram of Embodiment 1 of an ingress network element.

FIG. 10 is a schematic structural diagram of Embodiment 1 of an ingress network element. As shown in FIG. 10, the apparatus in this embodiment may include: a receiving module 11, a rule matching module 12, a labeling module 13, and a forwarding module 14, where the receiving module 11 is configured to receive a data packet forwarded by a distribution network element; the rule matching module 12 is configured to perform rule matching between the data packet and all locally stored data flow processing rules one by one to obtain the data flow processing rule corresponding to the data packet, where the data flow processing rule includes information about a data path for processing the data packet and instruction information of data operations that need to be performed by all FNs on the data path; the labeling module 13 is configured to mark the successfully matched data packet with a label according to the data flow processing rule corresponding to the data packet; and the forwarding module 14 is configured to forward the data packet with the label to a function node FN, so that the FN acquires, according to the label, instruction information of a data operation that needs to be performed.

The apparatus in this embodiment may be configured to perform the technical solution in the method embodiment shown in FIG. 4 or FIG. 5, and implementation principles and technical effects thereof are similar and are not described herein again.

Figure 11:
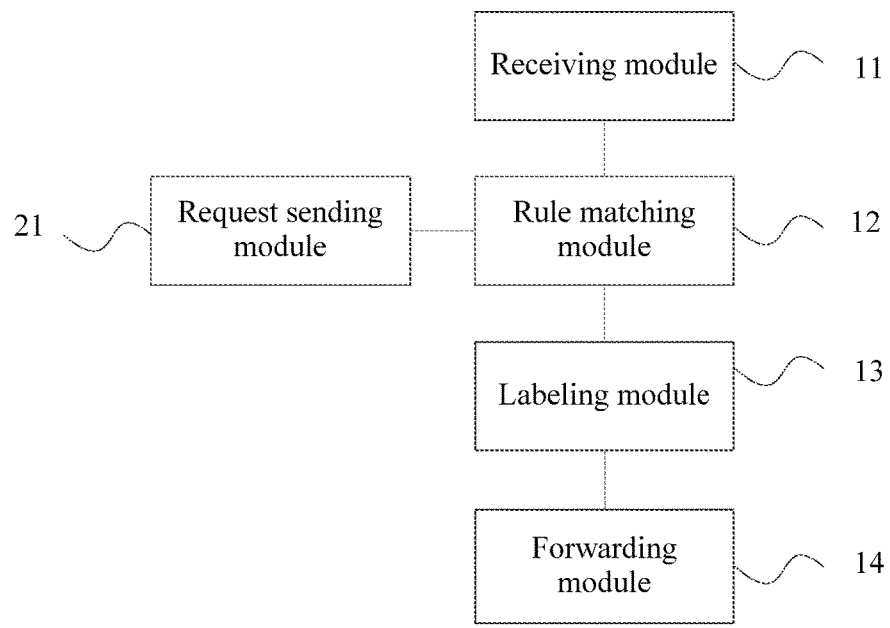
FIG. 11 is a schematic structural diagram of Embodiment 2 of an ingress network element.

FIG. 11 is a schematic structural diagram of Embodiment 2 of an ingress network element. As shown in FIG. 11, on a basis of the structure of the apparatus shown in FIG. 10, the apparatus in this embodiment may further include: a request sending module 21, configured to: if the data flow processing rule corresponding to the data packet is not obtained after rule matching is performed between the data packet and all the locally stored data flow processing rules one by one, send a rule request message to the SNC, so that the SNC generates the data flow processing rule according to the rule request message and with reference to the service requirement, a deployment status of the function node FN, and status information of a wireless network; and receive the data flow processing rule delivered by the SNC.

The apparatus in this embodiment may be configured to perform the technical solution in the method embodiment shown in FIG. 4 or FIG. 5, and implementation principles and technical effects thereof are similar and are not described herein again.

Figure 12:
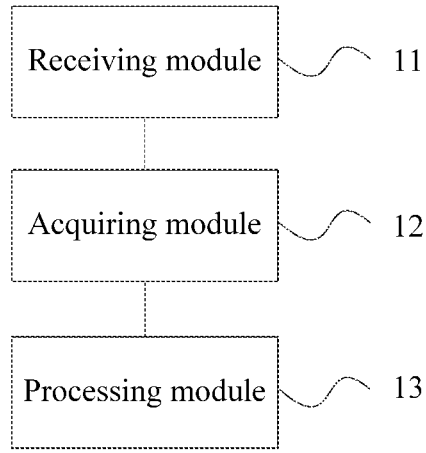
FIG. 12 is a schematic structural diagram of Embodiment 1 of an FN.

FIG. 12 is a schematic structural diagram of Embodiment 1 of an FN according to the present invention. As shown in FIG. 12, the apparatus in this embodiment may include: a receiving module 11, an acquiring module 12, and a processing module 13, where the receiving module 11 is configured to receive a data packet with a label that is sent by an ingress network element; the acquiring module 12 is configured to acquire, according to the label, instruction information of a data operation that needs to be performed; and the processing module 13 is configured to perform one or a combination of data processing and data forwarding on the data packet according to the instruction information.

The apparatus in this embodiment may be configured to perform the technical solution in the method embodiment shown in FIG. 6, and implementation principles and technical effects thereof are similar and are not described herein again.

Figure 13:
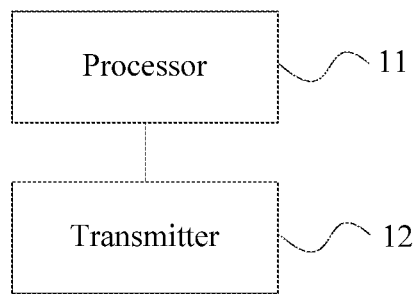
FIG. 13 is a schematic structural diagram of Embodiment 3 of an SNC.

FIG. 13 is a schematic structural diagram of Embodiment 3 of an SNC according to the present invention. As shown in FIG. 13, the device in this embodiment may include: a processor 11 and a transmitter 12, where the processor 11 is configured to generate a data flow processing rule according to a service requirement, a deployment status of a function node FN, and status information of a wireless network, where the data flow processing rule includes information about a data path for processing a data packet and instruction information of data operations that need to be performed by all FNs on the data path; and the transmitter 12 is configured to deliver the data flow processing rule, so that an ingress network element performs matching between the data flow processing rule and a data packet forwarded by a distribution network element, and marks a successfully matched data packet with a label, so that the FN acquires, according to the label, instruction information of a data operation that needs to be performed.

The apparatus in this embodiment may be configured to perform the technical solution in the method embodiment shown in FIG. 3, and implementation principles and technical effects thereof are similar and are not described herein again.

Figure 14:
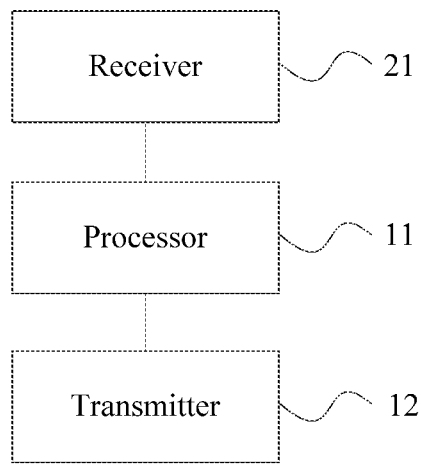
FIG. 14 is a schematic structural diagram of Embodiment 4 of an SNC.

FIG. 14 is a schematic structural diagram of Embodiment 4 of an SNC according to the present invention. As shown in FIG. 14, on a basis of the structure of the apparatus shown in FIG. 13, the device in this embodiment may further include: a receiver 21, configured to receive a rule request message sent by the ingress network element.

The apparatus in this embodiment may be configured to perform the technical solution in the method embodiment shown in FIG. 3, and implementation principles and technical effects thereof are similar and are not described herein again.

Figure 15:
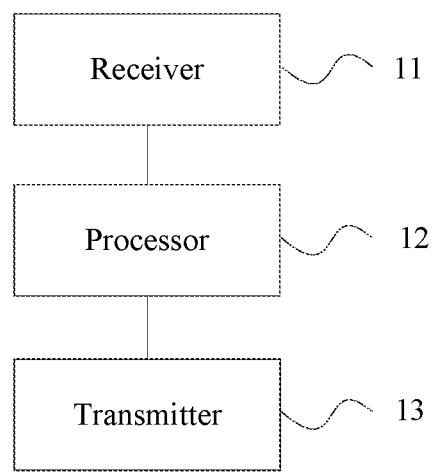
FIG. 15 is a schematic structural diagram of Embodiment 3 of an ingress network element.

FIG. 15 is a schematic structural diagram of Embodiment 3 of an ingress network element according to the present invention. As shown in FIG. 15, the device in this embodiment may include: a receiver 11, a processor 12, and a transmitter 13, where the receiver 11 is configured to receive a data packet forwarded by a distribution network element; the processor 12 is configured to perform rule matching between the data packet and all locally stored data flow processing rules one by one to obtain the data flow processing rule corresponding to the data packet, where the data flow processing rule includes information about a data path for processing the data packet and instruction information of data operations that need to be performed by all FNs on the data path, and mark the successfully matched data packet with a label according to the data flow processing rule corresponding to the data packet; and the transmitter 13 is configured to forward the data packet with the label to a function node FN, so that the FN acquires, according to the label, instruction information of a data operation that needs to be performed.

The apparatus in this embodiment may be configured to perform the technical solution in the method embodiment shown in FIG. 4 or FIG. 5, and implementation principles and technical effects thereof are similar and are not described herein again.

Figure 16:
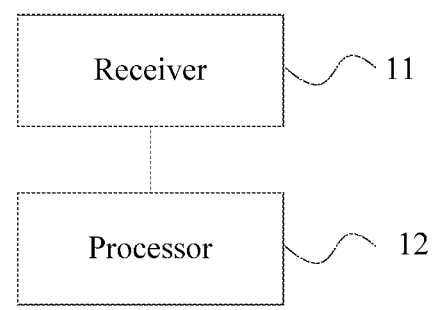
FIG. 16 is a schematic structural diagram of Embodiment 2 of an FN.

FIG. 16 is a schematic structural diagram of Embodiment 2 of an FN according to the present invention. As shown in FIG. 16, the device in this embodiment may include: a receiver 11 and a processor 12, where the receiver 11 is configured to receive a data packet with a label that is sent by an ingress network element; and the processor 12 is configured to acquire, according to the label, instruction information of a data operation that needs to be performed, and perform one or a combination of data processing and data forwarding on the data packet according to the instruction information.

The apparatus in this embodiment may be configured to perform the technical solution in the method embodiment shown in FIG. 6, and implementation principles and technical effects thereof are similar and are not described herein again.

In the several embodiments provided in the present invention, it should be understood that the disclosed apparatus and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be clearly understood by a person skilled in the art that, for the purpose of convenient and brief description, division of the foregoing functional modules is taken as an example for illustration. In actual application, the foregoing functions can be allocated to different functional modules and implemented as required, that is, an inner structure of an apparatus is divided into different functional modules to implement all or some of the functions described above. For a detailed working process of the foregoing apparatus, refer to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A system, comprising:
a single network controller (SNC), configured to perform a centralized control function;
an ingress network element, configured to perform matching on a data flow processing rule; and
a function node network (FNN), configured to perform a user plane function, wherein the FNN comprises a plurality of function nodes (FNs);
wherein the ingress network element and the FNN are communicatively connected to the SNC, and wherein the plurality of FNs are connected to each other directly or through an Internet Protocol (IP) network;
wherein the SNC is configured to perform signaling processing to implement a control plane function of the system, and to control and manage the ingress network element and the FNN in a manner of delivering a data flow processing rule to the ingress network element or to the FNN;
wherein the ingress network element is configured to perform matching between a data packet and the data flow processing rule, to mark the data packet with a label, and to forward the data packet with the label to the FNN, according to the label, wherein the label comprises instruction information indicating data operations to be performed on the data packet by a first FN of the plurality of FNs; and
wherein the first FN is configured to acquire, according to the instruction information comprised by the label, the data operations to be performed by the first FN, and to perform the data, operations on the data packet according to the instruction information.

2. The system according to claim 1, further comprising:
a network address translation (NAT); and
a distribution network element;
wherein the NAT is communicatively connected to the distribution network element, and the distribution network element is communicatively connected to the SNC and to the ingress network element;
wherein the NAT is configured to provide an interface between the system and an external data network, and to send the data packet to the distribution network element in a polling manner; and
wherein the distribution network element is configured to receive a distribution rule sent by the SNC, and to forward, to a corresponding ingress network element according to the distribution rule, the data packet sent by the NAT.

3. The system according to claim 1, further comprising a radio node (RN), wherein the RN is configured to implement a radio frequency function of the system.

4. The system according claim 1, further comprising a coordination network element, wherein the coordination network element is configured to manage resources of the system, and to implement dynamic resource allocation when the SNC needs to modify a first number of resources allocated to the ingress network element, based on a load status of the ingress network element, or when the SNC needs to modify a second number of resources allocated to the first FN, according to a load status.

5. The system according claim 1, wherein marking, by the ingress network element, the data packet with the label comprises:
adding subsequent hop-by-hop information to a header of the data packet according to information indicating a data path in the data flow processing rule.

6. A single network controller (SNC), comprising:
a processor; and
a non-transitory computer-readable storage medium storing a program to be executed by the processor, the program including instructions for:
generating a data flow processing rule, wherein the data flow processing rule is generated according to a service requirement, a deployment status of a first function node (FN) of a plurality of FNs, and status information of a wireless network, wherein the data flow processing rule comprises information indicating a data path to the first FN for processing any data packet that is determined to match the data flow processing rule, and instruction information indicating data operations to be performed on any data packet that is determined to match the data flow processing rule by the first FN indicated by the data path; and
delivering the data flow processing rule to an ingress network element, and causing the ingress network element to perform matching between the data flow processing rule and a first data packet forwarded by a distribution network element, to mark the first data packet with a label, wherein the label comprises the information indicating the data path and the instruction information indicating data operations to be performed by the first FN indicated by the data path, and causing the first FN to acquire, according to the instruction information comprised by the label, information about the data operations to be performed, and to perform the data operations on the data packet, according to the instruction information.

7. The SNC according to claim 6, wherein the program further includes instructions for:
delivering the data flow processing rule to the ingress network element, and causing the ingress network element to perform rule matching between the first data packet forwarded by the distribution network element and a locally stored data flow processing rule, and to mark the first data packet with a label; and
adding subsequent hop-by-hop routing information to a header of the first data packet, forwarding the first data packet to the FN, and causing the FN to acquire next-hop routing information according to the subsequent hop-by-hop routing information.

8. The SNC according to claim 6, wherein the program further includes instructions for:
delivering the data flow processing rule to the ingress network element; and
dividing the data flow processing rule into a plurality of second data flow processing rules, wherein each second data flow processing rule corresponds to a single FN of the plurality of FNs, and each second data flow respectively comprises instruction information indicating data processing to be performed by the respective single FN and respective next-hop routing information for forwarding a respective matched data packet; and
delivering the plurality of second data flow processing rules to each corresponding FN of the plurality of FNs, and causing the ingress network element to perform rule matching between any data packets forwarded to the respective FN by the distribution network element and a locally stored data flow processing rule, and to mark any matched data packets with a label, and forward any matched data packets to the corresponding single FN, causing the corresponding single FN to acquire, according to the instruction information and with reference to a locally stored second data flow processing rule, information for performing data processing and next-hop routing information for performing data forwarding.

9. The SNC according to claim 6, wherein the program further includes instructions for:
receiving a rule request message sent by the ingress network element; and
generating the data flow processing rule according to the rule request message and with reference to the service requirement, the deployment status of the first FN, and the status information of the wireless network.

10. The SNC according to claim 6, wherein the program further includes instructions for:
receiving signaling for creating a user data flow; and
generating the data flow processing rule according to the signaling and with reference to the service requirement, the deployment status of the first FN, and the status information of the wireless network.

11. An ingress network element, comprising:
a processor; and
a non-transitory computer-readable storage medium storing a program to be executed by the processor, the program including instructions for:
receiving a data packet forwarded by a distribution network element;
performing rule matching between the data packet and each data flow processing rule of a plurality of locally stored data flow processing rules;
determining, based on the rule matching, a first data flow processing rule of the plurality of locally stored data flow processing rules that corresponds to the data packet, wherein the first data flow processing rule comprises information indicating a data path of one or more function nodes (FNs) for processing the data packet, and instruction information of data operations to be performed by each FN of the one or more FNs;
marking the data packet with a label, wherein the label comprises the instruction information of data operations to be performed by each FN of the one or more FNs; and
forwarding the data packet with the label to a first FN of the one or more FNs, causing the first FN to acquire, according to the instruction information, data operations to be performed by the first FN on the data packet.

12. The ingress network element according to claim 11, wherein the program further includes instructions for:
marking the data packet with the label according to the data flow processing rule corresponding to the data packet and with reference to label mapping information preset in a single network controller (SNC), wherein the label is mapped to the data flow processing rule corresponding to the data packet;
adding, according to the information indicating the data path, subsequent hop-by-hop routing information to a header of the data packet; and
forwarding the data packet with the label to a next-hop FN of the one or more FNs according to the information indicating the data path, causing the one or more FNs to acquire next-hop routing information according to the subsequent hop-by-hop routing information.

13. The ingress network element according to claim 12, wherein the program further includes instructions for:
when the data packet is an initial data packet, adding a second data flow processing rule to the data packet with the label, wherein the second data flow processing rule comprises information indicating data processing to be performed by the first FN.

14. The ingress network element according to claim 11, wherein the program further includes instructions for:
marking the data packet with the label according to the data flow processing rule corresponding to the data packet and with reference to label mapping information preset in a single network controller (SNC), wherein the label is mapped to the data flow processing rule corresponding to the data packet; and
forwarding the data packet with the label to a next-hop FN of the one or more FNs according to the information indicating the data path, causing the one or more FNs to acquire, according to the instruction information and with reference to local second data flow processing rules, information for performing data processing and next-hop routing information for performing data forwarding, wherein the local second data flow processing rules comprise information indicating data processing to be performed by the one or more FNs and next-hop routing information for forwarding the data packet.

15. The ingress network element according to claim 11, wherein the program further includes instructions for:
receiving, from a single network controller (SNC), the first data flow processing rule delivered by a single network controller (SNC); and
locally storing the first data flow processing rule.

16. The ingress network element according to claim 11, wherein the program further includes instructions for:
when the rule matching between the data packet and each data flow processing rule of the plurality of locally stored data flow processing rules does not obtain a matching rule, sending a rule request message to a single network controller (SNC), causing the SNC to generate a second data flow processing rule according to the rule request message and with reference to a service requirement, a deployment status of the first FN, and status information of a wireless network; and
receiving the second data flow processing rule delivered by the SNC.

17. A function node (FN), comprising:
a processor; and
a non-transitory computer-readable storage medium storing a program to be executed by the processor, the program including instructions for:
receiving, from an ingress network element, a data packet with a label, wherein the label comprises instruction information indicating data operations to be performed on the data packet by the FN, wherein a function node network (FNN) comprises a plurality of FNs, the plurality of FNs comprises the FN, the FNN is configured to perform a user plane function, wherein the plurality of FNs are connected to each other directly or through an Internet Protocol (IP) network, wherein the ingress network element is configured to perform matching between the data packet and a data flow processing rule, to mark the data packet with the label, and to forward, according to the label, the data Packet with the label to the FN, wherein the ingress network element and the FNN are communicatively connected to a single network controller (SNC), wherein the SNC is configured to perform a centralized control function, wherein the SNC is further configured to perform signaling processing to implement a control plane function, and to control and manage the ingress network element and the FNN in a manner of delivering the data flow processing rule to the ingress network element or to the FNN;
acquiring, according to the instruction information comprised by the label, the data operations to be performed on the data packet; and
performing the data operations on the data packet, according to the instruction information.

18. The FN according to claim 17, wherein the program further includes instructions for:
searching a local first data flow processing rule according to the label, to acquire a first data flow processing rule corresponding to the label, wherein the first data flow processing rule comprises information indicating data processing to be performed by the FN; and
performing data processing on the data packet according to the first data flow processing rule, and acquiring next-hop routing information according to subsequent hop-by-hop routing information in a header of the data packet.

19. The FN according to claim 18, wherein the program further includes instructions for:
acquiring the first data flow processing rule from the data packet with the label; and
locally storing the first data flow processing rule.

20. The FN according to claim 17, wherein the program further includes instructions for:
searching for a local second data flow processing rule according to the instruction information, to acquire the local second data flow processing rule corresponding to the instruction information, wherein the local second data flow processing rule comprises information indicating data processing to be performed by the FN and next-hop routing information for forwarding the data packet; and
performing data processing on the data packet and next-hop forwarding on the data packet according to the local second data flow processing rule.

* * * * *